United States Patent [19]
Morey

[11] Patent Number: 5,385,363
[45] Date of Patent: Jan. 31, 1995

[54] TRAILER HITCH

[76] Inventor: James A. Morey, 1103 W. Central, Bentonville, Ark. 72712

[21] Appl. No.: 923,264

[22] Filed: Jul. 31, 1992

[51] Int. Cl.6 .......................... B60D 1/06; B60D 1/26
[52] U.S. Cl. .................. 280/511; 280/423.1; 280/512
[58] Field of Search .................. 280/400, 423.1, 425.2, 280/506, 511, 512, 477

[56] References Cited

U.S. PATENT DOCUMENTS

| | | | |
|---|---|---|---|
| 1,314,577 | 9/1919 | Dickerson | 280/513 |
| 1,636,295 | 7/1927 | Dempsey | 280/433 |
| 1,953,365 | 4/1934 | Reetz | 280/513 |
| 2,636,744 | 4/1953 | Trees | 280/510 |
| 3,061,334 | 10/1962 | Everett et al. | 280/513 |
| 3,773,358 | 11/1973 | Butler et al. | 280/513 |
| 3,811,706 | 5/1974 | Tucker et al. | 280/407 |
| 4,018,453 | 8/1977 | Bigelow | 280/512 |
| 4,209,184 | 6/1980 | Byers | 280/511 |
| 4,225,261 | 9/1980 | Marx | 403/122 |
| 4,283,073 | 8/1981 | Gostomski et al. | 280/508 |
| 4,320,907 | 3/1982 | Eaton | 280/511 |
| 4,360,217 | 11/1982 | Pittman | 280/513 |
| 4,426,172 | 1/1984 | Hilebrand | 280/512 |
| 4,560,184 | 12/1985 | Williams, Jr. | 280/508 |
| 4,778,196 | 10/1988 | Spoliansky | 280/512 |
| 5,263,735 | 11/1993 | Mann | 280/512 |

Primary Examiner—Mitchell J. Hill
Assistant Examiner—Anne Marie Boehler
Attorney, Agent, or Firm—Boyd D. Cox

[57] ABSTRACT

A trailer hitch for securing a trailer to a towing vehicle includes a holding plate fixed to the end of a vertical column portion of the trailer hitch tongue. The holding plate possesses a first aperture dimensioned to receive a hitch ball. A latch plate mounted for pivotal movement in a horizontal plane underlies the holding plate and possesses a second aperture dimensioned to receive the hitch ball. In a locked position, the apertures of the holding plate and latch plate are misaligned to prevent movement of the hitch ball therethrough. In an unlocked position, the apertures in the holding plate and latch plate are aligned. A conical guide secured to a bottom face of the latch plate guides the hitch ball through the apertures in the latch and holding plates. A coil tension spring biases the latch plate to the locked position. The weight of the trailer, when lowered onto the hitch ball, forces the latch plate to the unlocked position against the bias of the tension spring. When the hitch ball is fully seated, the tension spring restores the latch plate to the locked position. A retaining pin is biased by a coil compression spring to an extended position through axially aligned locking holes in the holding and latch plates to prevent movement of the latch plate to the unlocked position after connection of the trailer. A sheathed cable mechanism allows remote actuation of the retaining pin.

2 Claims, 4 Drawing Sheets

Fig. 2

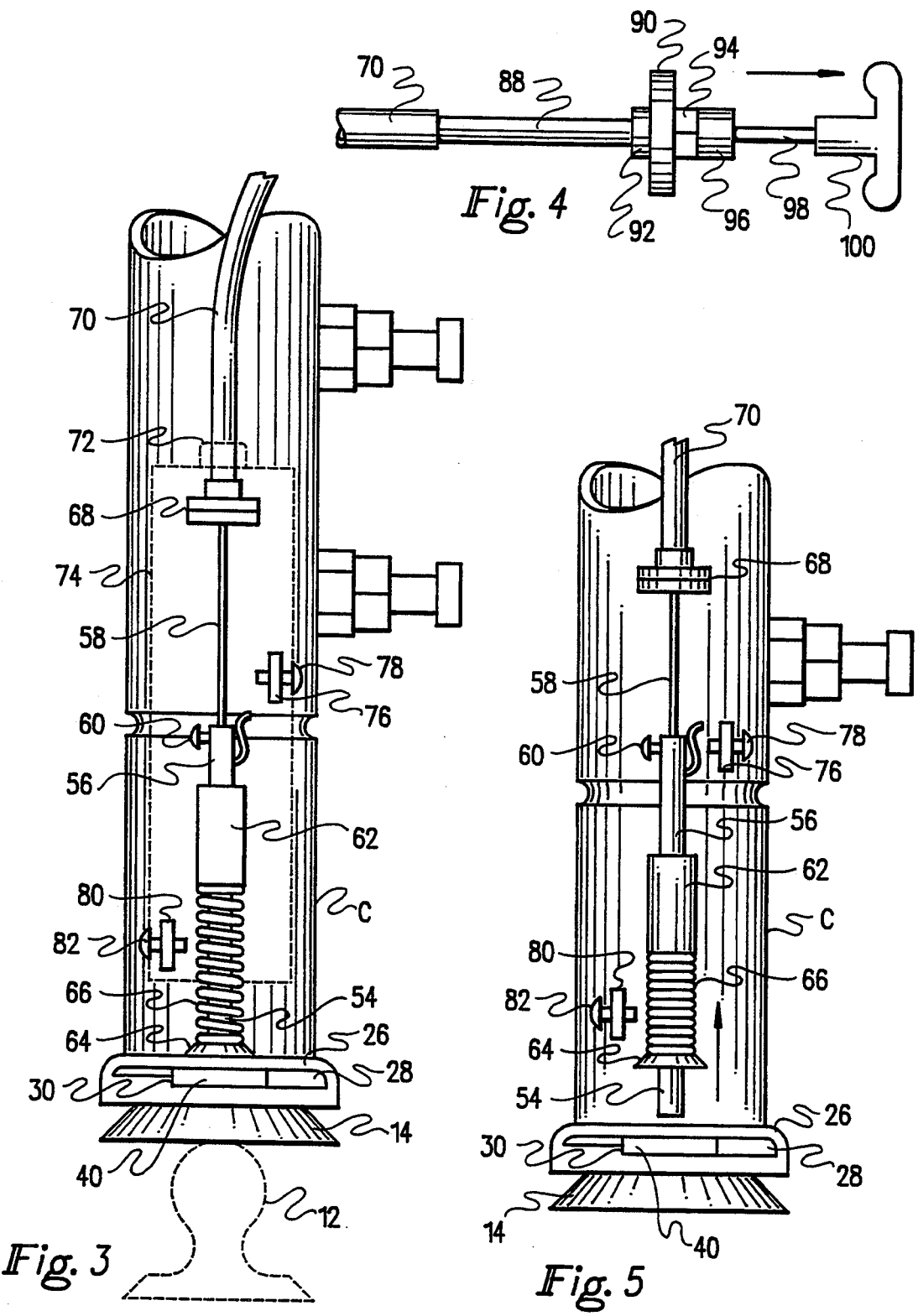

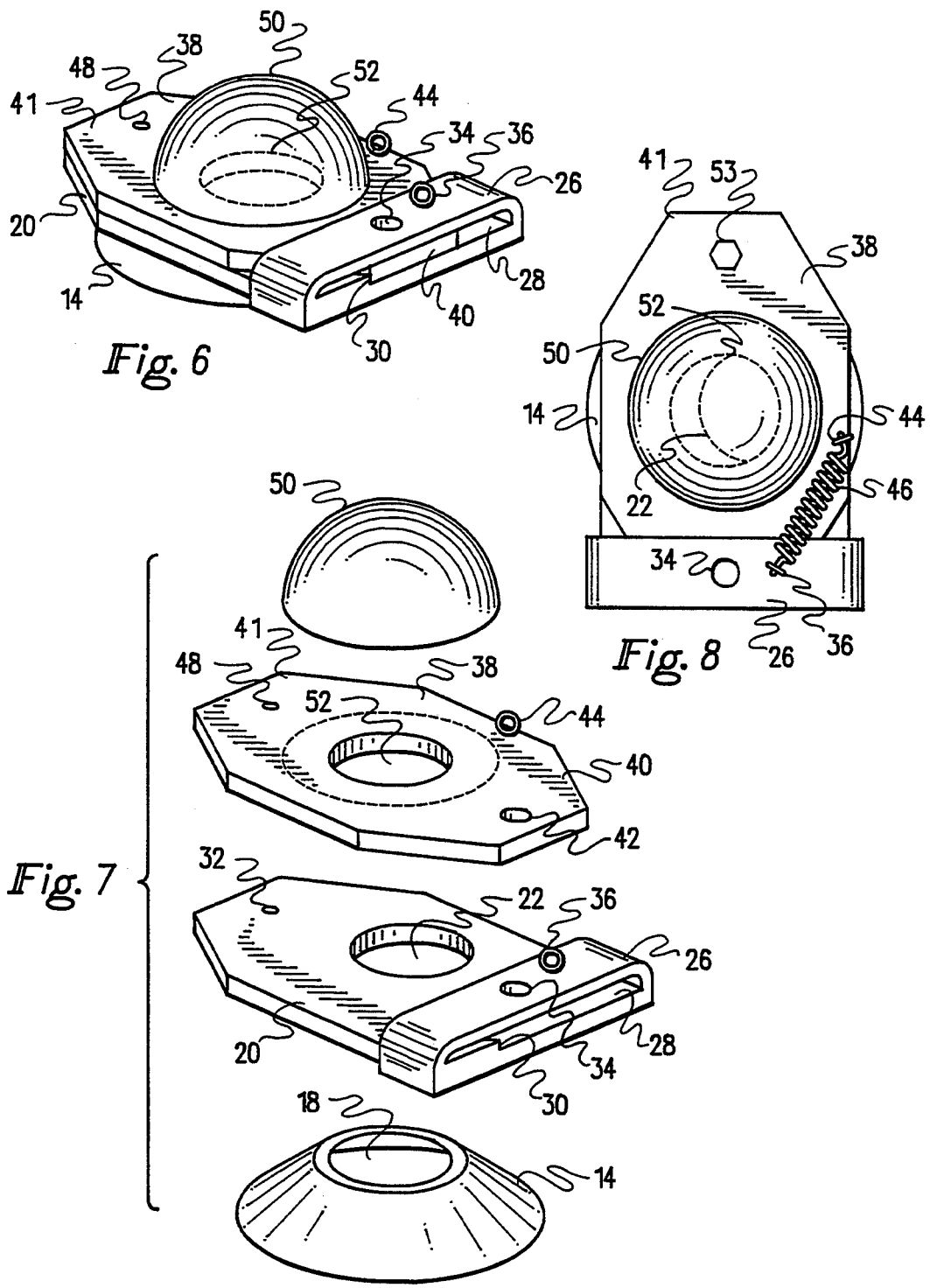

TRAILER HITCH

BACKGROUND OF THE INVENTION

1. Field of the Invention

The present invention relates to trailer hitches, and more particularly pertains to a trailer hitch of the type employed in conjunction with a so-called goose neck trailer. Such trailers conventionally employ a vertical column terminating in a socket and latch mechanism adapted for connection to a hitch ball secured centrally to the floor in the bed of a pick-up truck.

2. Description of the Prior Art

A conventional trailer hitch for use with such goose neck trailers includes a latch assembly affixed to a vertical column on the trailer tongue for receiving the trailer hitch ball in a latched relationship to secure the trailer to the transporting vehicle. A conventional latch assembly is comprised of (1) a horizontal holding plate possessing a circular aperture having a diameter slightly greater than that of the trailer hitch ball and positioned near the center thereof; (2) a latch plate possessing a circular aperture substantially identical to that of the holding plate pivotally secured on the bottom face of the holding plate such that the latch plate can be rotated in a horizontal plane allowing for the aperture of the holding plate to be aligned with the aperture of the latch plate in an unlocked position, and allowing the apertures to be misaligned in a locked position; and (3) a locking pin mounted for reciprocal axial movement for manual insertion through locking holes in the holding plate and latch plate disposed in axial alignment when the latch plate is in a locked position to lock the latch plate in such position.

This conventional assembly presents substantial problems for the user. Often, the trailer hitch ball is in a location on the vehicle (for instance, in the center of the cargo bed of a standard pick-up truck) that is not easily accessible. Because the latch plate and locking pin described above must be manually positioned to secure the trailer to the vehicle, accessing the trailer hitch ball latch assembly, when it is placed in proximity to the ball, can be burdensome, as well as unsafe. Also, in practice, there can be very little deviation regarding the vertical axial alignment of the trailer hitch ball and the apertures of the holding plate and latch plate in order for the latch assembly to receive the trailer hitch ball, as the trailer is lowered into place, making for a difficult and unsafe attachment operation.

SUMMARY OF THE INVENTION

In order to overcome these and other problems, the present invention provides an improved trailer hitch particularly for use in securing goose neck type trailers to a hitch ball mounted centrally in the floor of the cargo bed of a pick-up truck, which includes a holding plate fixedly secured to the distal end of a vertically extending column portion of the trailer hitch tongue. The holding plate possesses a central circular aperture dimensioned to receive the hitch ball. A latch plate pivotally mounted for limited reciprocal rotational movement in a horizontal plane underlies the holding plate and also possesses an aperture dimensioned to receive the hitch ball. In a locked position, the apertures of the holding plate and latch plate are misaligned to prevent movement of the hitch ball therethrough. In an unlocked position, the apertures in the holding plate and latch plate are aligned to allow free passage of the hitch ball therethrough. A downwardly opening conical guide secured to a bottom face of the latch plate guides the hitch ball through the apertures in the latch and holding plates. A coil tension spring biases the latch plate to the locked position. The weight of the trailer, when lowered onto the hitch ball, forces the latch plate to the unlocked position against the bias of the tension spring. When the hitch ball is fully seated, the tension spring restores the latch plate to the locked position. An axially movable retaining pin is biased by a coil compression spring to an extended position through axially aligned locking holes in the holding and latch plates to prevent movement of the latch plate to the unlocked position after connection of the trailer. A sheathed cable mechanism allows remote actuation of the retaining pin such that an individual does not have to lean into or climb into the pick-up truck bed to connect or release the trailer hitch.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described preferred embodiments of the invention.

BRIEF DESCRIPTION OF THE DRAWINGS

FIG. 3 is an enlarged side elevational detail view illustrating the manner of securing the trailer hitch of the present invention to a standard hitch ball, with the retaining pin in an extended position.

FIG. 4 is a detail view illustrating the remote cable retaining pin actuating mechanism of the trailer hitch according to the present invention.

FIG. 5 is a side elevational detail view illustrating the retaining pin of the trailer hitch of the present invention in a retracted position.

FIG. 6 is a perspective view illustrating the holding plate, latch plate, and conical guide components of the trailer hitch according to the present invention.

FIG. 7 is an exploded perspective view illustrating the holding plate, latch plate, and conical guide components of the trailer hitch according to the present invention.

FIG. 8 is a top plan view illustrating the assembled holding plate, latch plate, and conical guide components of the trailer hitch according to the present invention.

DETAILED DESCRIPTION OF THE PREFERRED EMBODIMENT(S)

Figure 1:
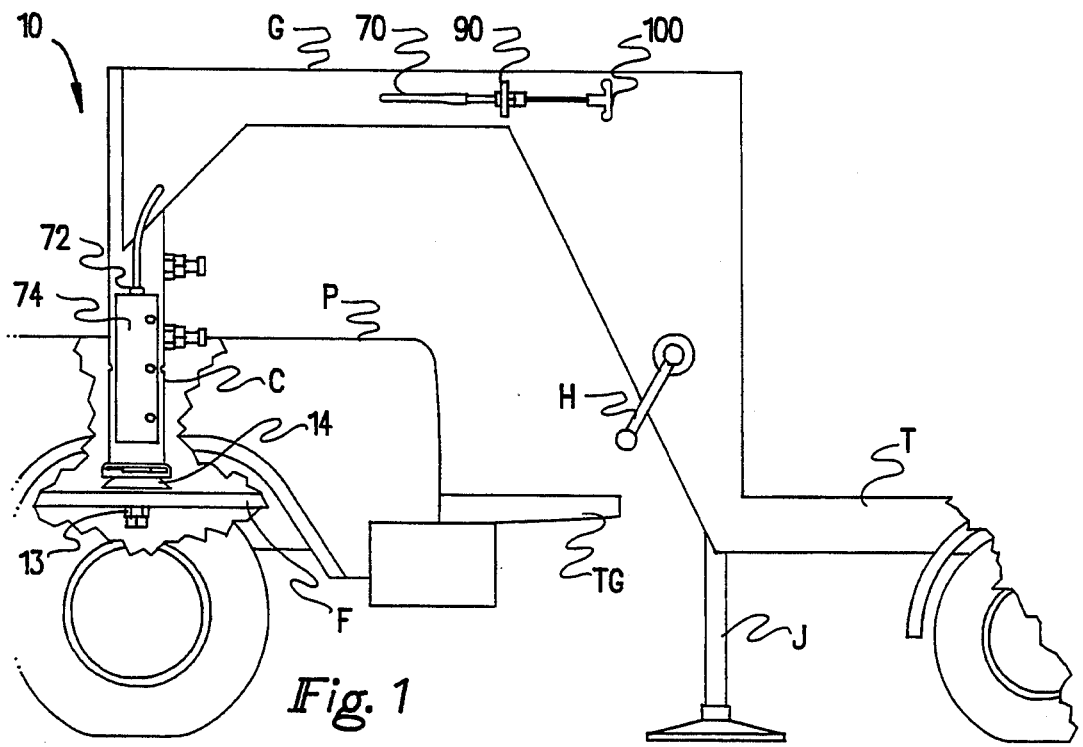
FIG. 1 is a side elevational view, partially cut away, illustrating the trailer hitch of the present invention securing a goose neck type trailer to a hitch ball mounted on the floor in the cargo bed of a pick-up truck.

Referring now to the drawings, wherein like reference numerals designate corresponding structure throughout the views, and referring in particular to FIG. 1, an improved trailer hitch 10 according to a preferred embodiment of the invention is particularly adapted for use with conventional trailers T of the type including a goose neck tongue G possessing a substantially vertically extending column C. A vertically axially reciprocal jack J is actuated by a manual hand crank H to selectively support the goose neck G when the trailer T is parked and not attached to a towing vehicle, such as a conventional pick-up truck P. As in conventional trailer hitches of this type, a standard substantially spherical trailer hitch ball 12 (FIG. 3) is mounted in an upstanding manner through the floor F of the cargo bed of the pick-up truck P by means of conventional threaded fasteners 13. In order to allow insertion and removal of the goose neck trailer tongue G from the cargo bed of the pick-up truck P, the tailgate TG of the pick-up P must be in the illustrated lowered position.

With reference now to FIGS. 6 through 8, the trailer hitch 10 of the present invention includes a frusto-conically tapering guide 14 possessing a central circular aperture 18 dimensioned to allow passage of the hitch ball 12 (FIG. 3) therethrough. The upper smaller diameter end of the inverted conical cup-shaped guide member 14 is secured to the bottom surface of a latch plate 20, for example by welding, such that the aperture 18 in the guide 14 is disposed in alignment with a laterally offset aperture 22 extending through the latch plate 20. The latch plate 20 includes a mounting bar portion 26 which forms a laterally extending slot 28. The slot 28 includes an abutment or shoulder 30 adapted to limit lateral movement of the latch plate 20 in a manner to be described subsequently. The latch plate 20 includes an aperture 32 adapted to receive a pivot screw or pin for the purpose of mounting the latch plate 20 for limited reciprocal rotational movement in a substantially horizontal plane. A hole 34 is formed through mounting bar 26 for the purpose of receiving an axially reciprocal retaining pin to selectively secure the latch plate 20 in a locked position. A spring mounting loop bracket 36 secured to the mounting bar 26 adjacent the retaining pin receiving aperture 34 is adapted to receive an end portion of a coil tension spring for the purpose of biasing the latch plate 20 to a locked position.

A holding plate 38 includes a first end portion 40 dimensioned for insertion into the slot 28 of the latch plate 20 formed by the mounting bar 26. A second opposite end 41 of the holding plate 38 is provided with a pivot pin or screw receiving aperture 48 adapted for alignment and cooperation with the similar aperture 32 formed in the latch plate 20. A second loop bracket 44 is secured to the holding plate 38 and is adapted to receive an end portion of a coil tension spring for the purpose of biasing the latch plate 20 to a locked position relative to the holding plate 38. The holding plate 38 possesses a central circular bore or aperture 52 dimensioned to allow passage of the trailer hitch ball 12 (FIG. 3) therethrough. A hemispherical dome 50 dimensioned to receive the hitch ball 12 therein is secured to the upper surface of the holding plate 38 in coaxial alignment with the aperture 52. In use, the inner surface of the dome 50 is coated with grease and forms a bearing surface allowing relative rotation of the hitch ball 12 to allow the trailer to pivot relative to the towing vehicle during turns. The holding plate 38 is preferably fixedly secured, by welding for example, to the distal end portion of the column C of the goose neck trailer tongue G, with the dome 50 inserted within the column C, as shown in FIGS. 1, 2, 3 and 5. The latch plate 20 is biased to a locked position relative to the holding plate 38 by a coil tension spring 46 having opposite ends secured respectively in loop brackets 36 and 44, as shown in FIG. 8. A suitable pivotal mounting member, for example a pivot mounting screw or bolt 53 extends through aligned apertures 48 and 32 formed respectively in the holding plate 38 and latch plate 20. Accordingly, it can be appreciated that the latch plate 20 is mounted for limited reciprocal pivotal movement about the axis of the pivot bolt 53 in a horizontal plane, within the limits afforded by engagement of the tab end portion 40 of the holding plate 38 in the slot 28 of the latch plate 20.

Figure 9:
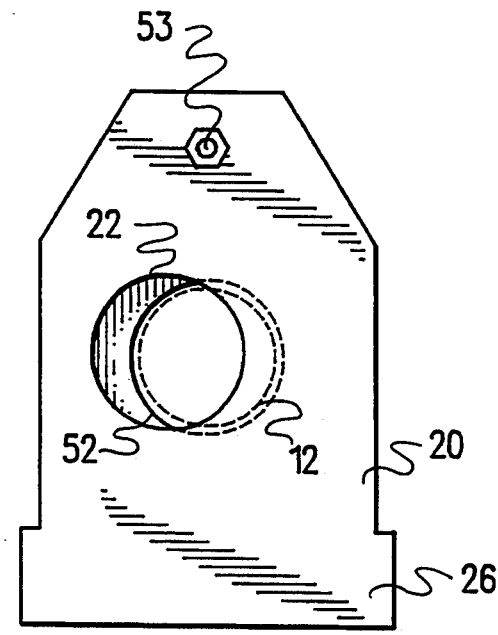
FIG. 9 is a diagrammatic bottom plan view illustrating the holding plate and latch plate assembly in a locked position.
Figure 10:
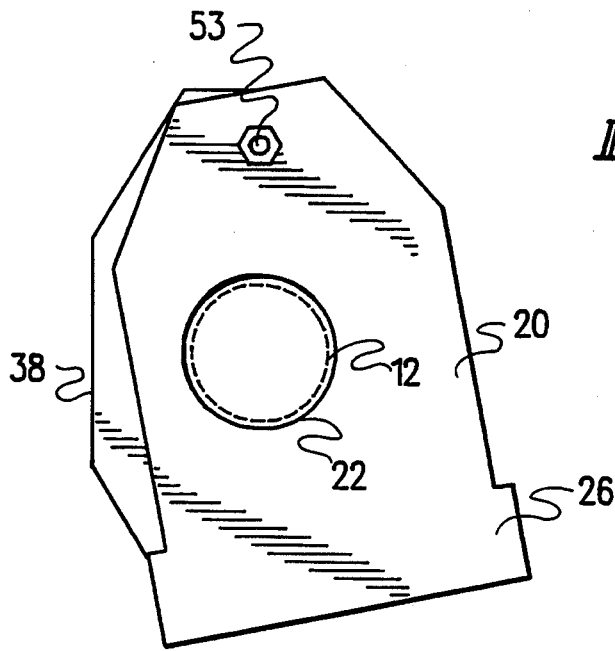
FIG. 10 is a diagrammatic bottom plan view illustrating the holding plate and latch plate assembly in an unlocked position.

With reference to FIGS. 9 and 10, the manner of operation of the latching mechanism formed by the assembly of the latching plate 20 and holding plate 38 will now be described. The trailer hitch ball 12 is illustrated in dotted lines in FIGS. 9 and 10. The laterally offset aperture 22 formed through the latch plate 20 is axially misaligned with the central circular aperture 52 of the holding plate 38 when the latch plate 20 and holding plate 38 are in the overlying relation shown in FIG. 9. In the unlocked position illustrated in FIG. 10, the latch plate 20 has been pivoted in a horizontal plane about the axis of pivot bolt 53 relative to the holding plate 38, such that the aperture 22 in the latch plate 20 is disposed in axial alignment with the central circular aperture 52 formed through the holding plate 38. In this unlocked configuration, the hitch ball 12 may pass freely between the aligned apertures in the latch plate 20 and holding plate 38, and into the dome 50 inserted within the hollow distal end portion of the column C. It should be noted that the above-described pivotal movement of the latch plate 20 to the unlocked position occurs automatically as the hitch ball 12 is directed by conical guide 14 against the outer edge of aperture 22 and subsequently against the edge of aperture 52, in effect functioning as a cam.

With reference now to FIGS. 1 through 5, the remote cable actuating mechanism of the trailer hitch 10 according to the present invention will now be described. As shown in FIGS. 3 and 5, a substantially cylindrical elongated retaining pin 54 is mounted for reciprocal axial movement in an open-ended sleeve 62 and possesses an upper proximal end 56 secured to an end portion of a wire cable 58 by suitable fastening means, for example by set screw 60. An enlarged diameter radial flange 64 is secured at a distal end of the retaining pin 54. A coil compression spring 66 surrounds the retaining pin 54 and is captured between the radial flange 64 and the distal end of sleeve 62. Accordingly, as cable 58 is tensioned, retaining pin 54 will move upwardly, as shown in FIG. 5, against the bias of the coil spring 66. Upon a release of tension in the cable 58, the coil compression spring 66 will bias flange 64 and attached retaining pin 54 downwardly, to the extended position illustrated in FIG. 3. As can be appreciated with reference to FIGS. 6, 7, and 8, the retaining pin 54 extends in the position illustrated in FIG. 3 through aligned aperture 34 formed in the mounting bar portion 26 of the latch plate 20 and also through aperture 42 in the tab end portion 40 of the holding plate 38 disposed within slot 28. As may now be understood, the retaining pin 54 maintains the latch plate 20 and holding plate 38 in the locked position so as to prevent any axial movement of the hitch ball 12 into or out of the hollow, ball-receiving dome 50 disposed within the distal end portion of column C.

The remote cable actuating mechanism includes an enlarged diameter substantially cylindrical collar and connector member 68 secured to a cable sheath 70 extending through a grommet 72 into a substantially hermetically sealed housing 74. The collar 68 functions to secure the cable sheath 70 in coaxial alignment around the cable 58, and also to prevent the sheath 70 from being pulled outwardly through the grommet 72. A plurality of threaded fasteners 76, 78, 80, and 82 preferably take the form of cooperating threaded apertured tabs and conventional screws which function to secure the housing 74 to the outer surface of the column C. The housing 74 serves to prevent dirt and moisture from fouling and potentially corroding the internal components of the retaining pin mechanism.

Figure 2:
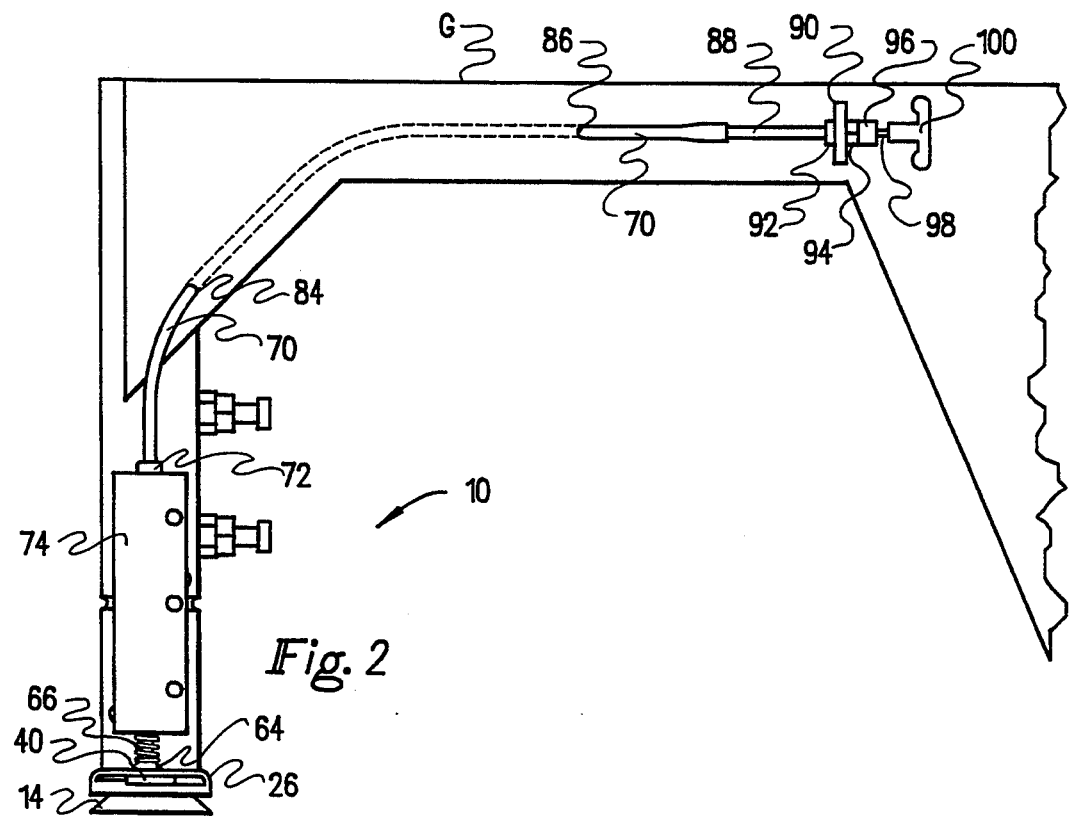
FIG. 2 is an enlarged partial side elevational view illustrating the trailer hitch of the present invention mounted on a goose neck trailer tongue.
Figure 11:
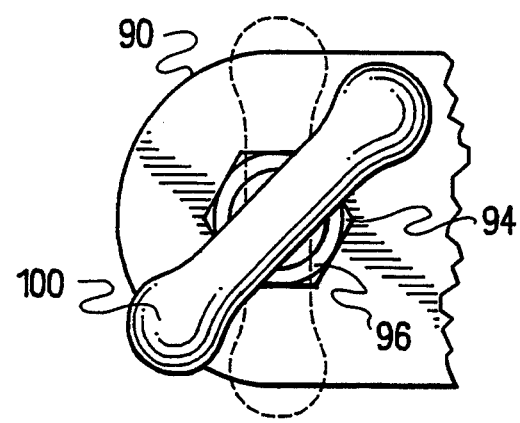
FIG. 11 is a detail end view illustrating the remote cable actuating mechanism of the trailer hitch according to the present invention.

As shown in FIG. 2, the cable sheath 70 preferably extends internally within the goose neck trailer tongue G, through an aperture 84. For purposes of allowing manual actuation of the cable mechanism, the cable sheath 70 extends outwardly from the interior of the goose neck trailer tongue G through an aperture 86. The manual cable actuating mechanism includes a rigid sleeve 88 press fit into the upper end of the cable sheath 70 and enclosing an end portion of the cable 58. A plurality of cooperating threaded fasteners, such as nuts 92 and 94, secure the sleeve 88 to a transverse tab 90 welded to the goose neck trailer tongue G. The sleeve 88 terminates in a cylindrical bushing 96 receiving a rigid shaft 98 fixedly secured to a T-shaped handle 100. The internal end portion of the shaft 98 is connected to the cable 58. This mechanism is a conventional, commercially available, manual cable actuating mechanism sold under the name of TURN-TO-LOCK PUSH PULL CONTROL available from Imperial Eastman Corporation, Imperial Division, of Chicago, Ill. as part number 54-R-9. This mechanism includes an axial position locking mechanism actuated by a ¼ turn of the handle 100. For example, to retract the retaining pin 54 as shown in FIG. 5, the handle 100 is rotated ¼ turn in a clockwise direction, as shown in FIG. 11, and is then moved to the right, as shown in FIG. 1, causing a tension in the cable 58 and upward movement of the retaining pin 54, as depicted in FIG. 5. In order to maintain the retaining pin 54 in the retracted position shown in FIG. 5, the handle 100 is then rotated back ¼ turn in a counterclockwise direction, locking the mechanism against axial movement and restraining downward axial movement of the retaining pin 54 against the bias of the spring 66. A user then backs the pick-up truck P until the column and guide 14 are disposed approximately vertically above the hitch ball 12. At this point, the user leaves the cab of the pick-up truck P and manipulates handle H to raise the trailer jack J, causing downward movement of the guide 14 over the hitch ball 12. The frustoconical guide 14 directs the hitch ball 12 into the aperture 22 of the latch plate 20, which causes a lateral pivotal movement of the latch plate 20 relative to the holding plate 38, as shown in FIG. 10. This lateral pivotal movement of the latch plate 20 to the unlocked position is effected automatically upon lowering of the column C against the bias of the coil tension spring 46 illustrated in FIG. 8. As the hitch ball 12 moves through the aperture 22 in the latch plate 20 and through the aperture 52 in the holding plate 38, the latch plate 20 will automatically spring back to the locked position illustrated in FIGS. 8 and 9. At this point, the user will again rotate the handle in the clockwise direction to 100¼ turn release the handle 100 for axial movement and cause downward movement of the retaining pin 54 into the extended position illustrated in FIG. 3.

Accordingly, it can be appreciated that the present invention allows an individual to remotely actuate the trailer hitch without the requirement of leaning over or crawling into the pick-up truck P to manually manipulate any latching or retaining pin mechanisms. Additionally, the actuating handle 100 is positioned conveniently adjacent the jack handle H in order that an individual might actuate the mechanism with a minimum of movement and other inconvenience. The trailer hitch 10 of the present invention allows individuals of limited strength to easily connect a very large goose neck type trailer, due to the self aligning provisions afforded by guide 14 and the automatic opening and closing of the latch plate 20 against the bias of the spring 46 effected by the weight of the trailer hitch tongue G upon raising the trailer jack J.

It is contemplated that the various components of the present invention may be formed from conventional metal, plastic and composite materials within the ambit of those of ordinary skill in the art.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, materials and arrangement of parts within the principles of the invention to the full extent indicated by the broad general meaning of the terms in which the appended claims are expressed.

What is claimed is:

1. In a trailer hitch for securing a trailer to a hitch ball mounted on a towing vehicle, said trailer hitch including a column secured to said trailer, a holding plate mounted at a distal end of said column, said holding plate including a first aperture dimensioned to receive said hitch ball, a latch plate possessing a second aperture dimensioned to receive said hitch ball, the improvement comprising:

a pivot member mounting said latch plate for limited reciprocal pivotal movement relative to said holding plate between a locked position in which said first and second apertures are misaligned to prevent passage of said hitch ball and an unlocked position in which first and second apertures are aligned to allow passage of said hitch ball;

a conically tapering cup-shaped guide member secured to said latch plate substantially disposed in coaxial alignment with said second aperture for aligning said hitch ball with said second aperture and for directing said hitch ball against an edge portion of said first aperture such that insertion of said hitch ball into said guide means and said first aperture automatically cams said latch plate to said unlocked position to allow passage of said hitch ball through said first aperture;

a tension spring possessing a first end secured to said latch plate and an opposite end secured to said holding plate, said tension spring biasing said latch plate to said locked position such that said latch plate automatically returns to said locked position upon complete insertion or withdrawal of said hitch ball from said first and second apertures;

a retaining pin mounted for movement between a retracted position and an extended position through a first hole in said holding plate and a second hole in said latch plate, said first and second holes disposed in coaxial alignment in said locked position;

a compression spring biasing said retaining pin to said extended position;

a cable secured to said retaining pin to allow remote actuation of said retaining pin; and means for selectively locking said cable in a selected position to selectively secure said retaining pin in said retracted position.

2. In a trailer hitch for securing a trailer to a hitch ball mounted on a towing vehicle, said trailer hitch including a column secured to said trailer, a holding plate mounted at a distal end of said column, said holding plate including a first aperture dimensioned to receive said hitch ball, a latch plate possessing a second aperture dimensioned to receive said hitch ball, the improvement comprising:

means mounting said latch plate for movement relative to said holding plate between a locked position in which said first and second apertures are misaligned to prevent passage of said hitch ball and an unlocked position in which first and second apertures are alinged to allow passage of said hitch ball;

guide means secured to said latch plate for aligning said hitch ball with said second aperture and for directing said hitch ball against an edge portion of said first aperture such that insertion of said hitch ball into said guide means and said first aperture automatically cams said latch plate to said unlocked position to allow passage of said hitch ball through said first aperture;

means biasing said latch plate to said locked position such that said latch plate automatically returns to said locked position upon complete insertion or withdrawal of said hitch ball from said first and second apertures;

retaining means for securing said latch plate in said locked postion;

said retaining means comprising a retaining pin mounted for movement between a retracted position and an extended position through a first hole in said holding plate and a second hole in said latch plate, said first and second holes disposed in axial alignment in said locked position;

a cable secured to said retaining pin to allow remote actuation; and means for selectively locking said cable in a selected position to selectively secure said retaining pin in said retracted position.

* * * * *